United States Patent [19]
Ono

[11] Patent Number: 5,383,388
[45] Date of Patent: Jan. 24, 1995

[54] STARTING DEVICE

[75] Inventor: Katsuyasu Ono, Kanagawa, Japan

[73] Assignee: NSK Ltd., Tokyo, Japan

[21] Appl. No.: 115,827

[22] Filed: Sep. 3, 1993

[30] Foreign Application Priority Data

Oct. 5, 1992 [JP] Japan ............... 4-074679[U]

[51] Int. Cl.6 .............. B60R 21/32; B60R 21/26; H01H 35/14
[52] U.S. Cl. ................ 89/1.14; 280/734; 280/808
[58] Field of Search .............. 102/272, 273, 275.11; 280/734, 806, 807, 808; 89/1.14

[56] References Cited

U.S. PATENT DOCUMENTS

| | | | |
|---|---|---|---|
| 3,601,081 | 8/1971 | Smith et al. | 116/114 AH |
| 3,613,944 | 10/1971 | Zeigler et al | 222/5 |
| 3,638,501 | 2/1972 | Pracher | 102/272 |
| 4,161,228 | 7/1979 | Svensson | 280/734 |
| 4,873,401 | 10/1989 | Ireland | 200/61.53 |
| 4,889,068 | 12/1989 | Tabata et al. | 102/274 |
| 4,902,036 | 2/1990 | Zander et al. | 280/734 |
| 4,982,664 | 1/1991 | Norton | 180/282 |
| 5,143,403 | 9/1992 | Föhl | 280/734 |
| 5,149,128 | 9/1992 | Föhl | 280/734 |

FOREIGN PATENT DOCUMENTS

| | | |
|---|---|---|
| 2117963 | 11/1971 | Germany . |
| 2232288 | 6/1972 | Germany . |
| 2801426 | 1/1978 | Germany . |
| 224242 | 1/1990 | Japan . |
| 396456 | 4/1991 | Japan . |
| 4108049 | 4/1992 | Japan . |

OTHER PUBLICATIONS

Patents Abstracts of Japan, M-1287, Jul. 28, 1992, vol. 16, No. 350, 4-108049, "Starter Device".
Patents Abstracts of Japan, M-1135, Jul. 12, 1991, vol. 15, No. 276, 3-96456, "Retightening Method and Device of Safety Belt Device".

Primary Examiner—David Brown
Attorney, Agent, or Firm—Sughrue, Mion, Zinn, Macpeak & Seas

[57] ABSTRACT

An object of the present invention is to provide a starting device which is prevented from operating erroneously, thus being high in reliability, and which, being simple in structure, is assembled with high efficiency, and is accordingly low in manufacturing cost. The starting device, according to the present invention, adapted to strike a detonator (10) in response to an acceleration higher than a predetermined value to activate a gas generator (8). In the staring device, an igniting pin (22) adapted to move towards the detonator (10) to collide with the detonator thereby to ignite the detonator is provided. An inertial body (23) is made of a permanent magnet for supplying kinetic energy to the igniting pin (22). An annular permanent magnet (24) the inside diameter of which is larger than the outside diameter of the inertial body (23) is provided. The inertial body (23) is moved towards the detonator when the force of inertia of the inertial body becomes greater than a magnetic repulsion force between the annular permanent magnet (24) and the inertial body (23), thereby a detonator (10) is struck.

20 Claims, 3 Drawing Sheets

STARTING DEVICE

BACKGROUND OF THE INVENTION

This invention relates to an improvement of a starting device which activates a seat belt tightening device which, upon collision of the vehicle, rotates the winding shaft of its retractor, or an air bag device which, upon collision off the vehicle, inflates its air bag with gas to protect the passenger from being shocked by the collision.

Recently, in an emergency such as the collision of a vehicle, in order to protect passengers in the vehicle, passive constraining means such as a seat belt tightening device and an air bag device have been extensively employed.

The seat belt tightening device is designed for instance as follows: A piston slidably set in a cylinder is coupled to one end of a cable wound on a pulley which is mounted on the winding shaft of a retractor. The pressure of expansion of the gas acting on the piston applies tension to the cable, so that the cable turns the winding shaft of the retractor in a webbing winding direction, thereby to tighten the webbing laid over the passenger. Therefore, the seat belt tightening device includes a gas generator which supplies the gas which, as was described above, acts on the piston in the cylinder to apply tension to the cable. The gas generator comprises an igniting heater, and explosive. In response to a detection signal from a collision sensor, the igniting heater is electrically energized to generate heat to ignite the explosive thereby to produce the gas which is applied to the piston.

The air bag device is designed for instance as follows: A module is set in the steering wheel, which is made up of a center pad, a folded air bag, and an inflator (or gas generator). Upon collision of the vehicle, the inflator is activated to generate gas quickly to inflate the air bag instantaneously. The air bag thus inflated receives the passenger and decreases the shock applied to him. For this purpose, the air bag device has a gas generator which produces gas to inflate the air bag. In the gas generator, and igniter (priming composition) is ignited to burn an explosive (propellant) to produce gas. The gas thus produced inflates the air bag.

Hence, it is necessary for the gas generators of the seat belt tightening device and the air bag device to have a starting device which, upon detection of the collision of the vehicle, burns the igniter (priming composition) to activate the gas generator. The starting device is generally designed as follows: Similarly to the igniting devices disclosed by Unexamined Japanese Patent Publication Nos: Hei. 2-24242(1990) and Hei. 3-96456(1991), an igniting heater is provided for the igniter (priming composition), and it is electrically energized to generate heat to burn the igniter (priming composition).

The starting device needs a vehicle body acceleration detecting means, such as a sensor for sensing the collision of a vehicle or the like, to produce an igniting signal. The starting device also needs a control circuit for determining, via from the igniting signal, whether or not the igniting heater should be electrically energized. Therefore, the number of components of the starting device are relatively large and intricate in structure. Furthermore, in order to assure the reliability of the starting device, it is essential to positively connect the various component means to one another. That is, it is rather difficult to assemble the starting device with high efficiency, and accordingly the resultant starting device is expensive.

In order a starting device to overcome the above-described difficulties has been proposed by Unexamined Japanese Patent Publication No. Hei. 4-108049 (1992). In the starting device, upon collision of the vehicle, a weight, which serves as a vehicle body acceleration sensor, causes an igniting pin to strike a detonator provided for the igniter (priming composition), in order to burn the igniter (priming composition). However, this starting device is a mechanical one which operates without an intricate control circuit.

More specifically, in the starting device, when the weight moves, the trigger shaft is turned, so that the stopper of the latter is disengaged from the flange of the igniting pin. Consequently the igniting pin is pushed out by the elastic force of a compression spring to strike the detonator.

In the case of the above-described starting device in which the igniting pin is caused to strike the detonator in the igniter (priming composition), the engaging portions of the stopper of the trigger shaft and the flange of the igniting pin may rust or may be fixedly tied to each other when it is used for a long time. In addition, it is rather difficult to stabilize the frictional coefficient of the engaging portions. The weight, which is the vehicle body acceleration detecting means, is vibrated not only when the vehicle collides with something but also when the door is closed or when the vehicle body is knocked. Therefore, if the sensitivity of the weight is carelessly increased, then the probability is increased that the starting device will operate erroneously. Consequently, it is difficult to adjust the acceleration detecting characteristic of the starting device. Thus, designing the starting device must be extremely precise.

SUMMARY OF THE INVENTION

In view of the foregoing, an object of this invention is to eliminate the above-described difficulties accompanying a conventional starting device. More specifically, an object of the invention is to provide a starting device which is prevented from operating erroneously and thus being high in reliability. It is also an object of this invention to provide a staring device which, is simple in structure, is assembled with high efficiency, and is accordingly low in manufacturing cost.

The foregoing object of the invention has been achieved by the provision of the following three embodiments:

The first embodiment is a starting device adapted to strike a detonator when it accelerates higher than a predetermined value, to activate a gas generator, which, according to a first embodiment of the invention, comprises:

- an igniting pin adapted to move towards the detonator to collide with the detonator thereby to ignite the detonator;
- an inertial body made of a permanent magnet for supplying kinetic energy to the igniting pin; and
- an annular permanent magnet the inside diameter of which is larger than the outside diameter of the inertial body,
- the inertial body being moved towards the detonator when the force of inertia of the inertial body becomes greater than a magnetic repulsion force between the annular permanent magnet and the inertial body.

The second embodiment is a starting device adapted to strike a detonator when it accelerates higher than a predetermined value to activate a gas generator, which, according to a second aspect of the invention, comprises:

an igniting pin adapted to move towards the detonator to strike against it to ignite it;
an inertial body made of a cylindrical permanent magnet, the inertial body having a through-hole along the central axis in which the igniting pin is loosely inserted;
an annular permanent magnet the inside diameter of which is larger than the outside diameter of the inertial body; and
a trigger housing accommodating the igniting pin, the inertial body and the annular permanent magnet, the annular permanent magnet being fitted in the trigger casing on the side of the detonator while the inertial body being set in the trigger casing on the side of the bottom wall in such a manner that the annular permanent magnet and the inertial body are confronted with each other through the same magnetic poles.

The third embodiment is a starting device for a seat belt tightening device which, upon collision of a vehicle equipped with the seat belt tightening device, is driven by gas pressure to turn the winding shaft of a retractor to pull in a seat belt, in which, in response to an acceleration higher than a predetermined value, a detonator is struck to activate a gas generator, which, according to a third embodiment of the invention, comprises:

an igniting pin adapted to move towards the detonator to collide with it thereby to ignite it;
an inertial body made of a cylindrical permanent magnet, the inertial body having a through-hole along the central axis in which the igniting pin is loosely inserted;
an annular permanent magnet, the inside diameter of which is larger than the outside diameter of the inertial body; and
a trigger housing accommodating the igniting pin, the inertial body, and the annular permanent magnet.

In the starting device of the invention, upon collision of the vehicle the inertial body moves towards the detonator at an acceleration higher than the predetermined value. The inertial body directly provides energy for striking the detonator, which dispenses with the need of the trigger shaft to be adapted to release the igniting pin as the inertial body moves, and the means for energizing the igniting pin towards the detonator. Hence, the starting device is simple in structure, and the striking energy to be applied to the detonator can be increased according to the acceleration acting on the inertial body. The starting system is surrounded with a shock absorbing material in all directions except the direction of movement of the inertial member so that it is less sensitive to pulse-like accelerations in directions other than a direction in which a shock occurs when the vehicle collides with something in front of the vehicle.

BRIEF DESCRIPTION OF THE DRAWING(S)

DETAILED DESCRIPTION OF THE PREFERRED EMBODIMENT(S)

Figure 1:
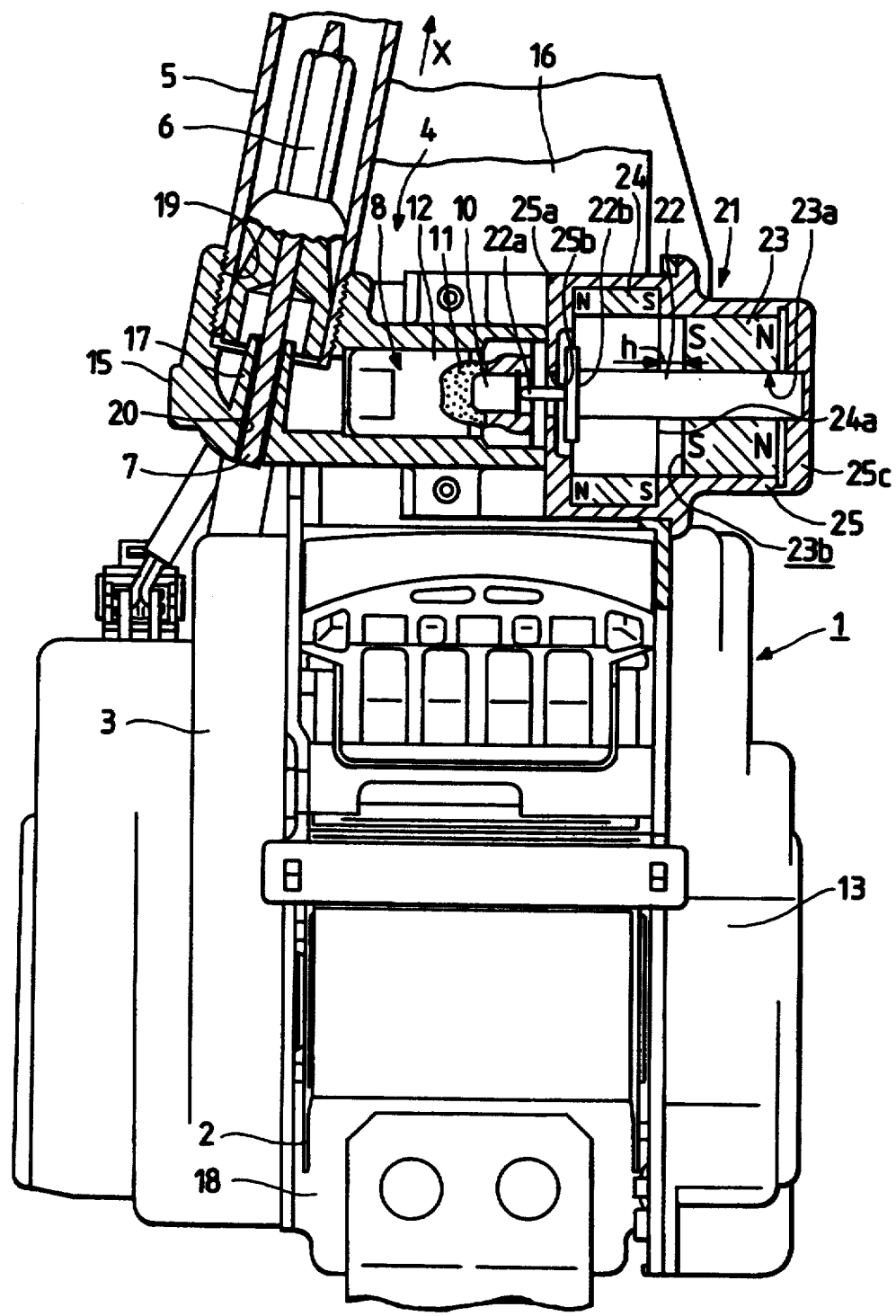
FIG. 1 is a front view, with parts cut away, showing essential components of an example of a retractor with a pretensioner, which constitutes a first embodiment of this invention.

Preferred embodiments of this invention will be described with reference to the accompanying drawings.

FIG. I illustrates a first embodiment of the present invention. In, FIG. 1, a retractor 1 with a pretensioner 3, has a winding reel 2 on which a webbing 16 has been wound in such a manner that it can be freely wound on or unwound from it. The winding reel 2 is kept urged by a winding spring coupled to its winding shaft to wind the webbing 16. Upon collision of the vehicle, an emergency locking mechanism 13 operates to stop the rotation of the winding shaft to prevent the webbing from being unwound from the reel 2.

The retractor 1 has a pretensioner 3 on one side wall of a retractor base 18 which is substantially U-shaped. The pretensioner 3 is a seat belt tightening device which, upon collision of the vehicle, operates to turn the winding shaft to tighten the seat belt. The pretensioner 3 operates to apply tension to a power transmission member, namely, a wire 7, made of metal, which is wound on a pulley (not shown) mounted on one end portion of the winding shaft, to cause the wire 7 to drive the winding shaft in a webbing winding direction so that the webbing 16 laid over the passenger is tightened at the collision of the vehicle. The pretensioner 3 has driving means 4 for applying tension to the wire 7.

The driving means 4 comprises: a metal piston 6 connected to the end of the wire 7; a metal cylinder 5 in which the piston 6 is slidably fitted; a metal housing 15 through which the base end portion of the cylinder 5 is communicated with the gas jetting section of a gas generator 8; and a starting device 21 for operating the gas generator 8 in response to a predetermined acceleration or higher.

The housing 15 is a substantially L-shaped pipe member which is bent substantially 90°. The base end portion of the cylinder 5 is fixedly fitted in one opening 19 of the housing 15. The wire 7 connected to the piston 6 is inserted into a hole 20 which is formed in the housing 15 in confrontation with the one opening 19.

In the housing 15, a round-pipe-shaped protective wall 17 is protruded from the periphery of the hole 20 towards the opening 19, so that the part of the wire 7 which is located in the housing 15 extending from the lower end face of the piston is covered by the protective wall 17.

The gas generator 8 is formed as follows: A detonator 10 is built in a casing 12 which is filled with an explosive 11 and sealingly fitted in the frame. When the detonator 10 is struck, the explosive 11 is ignited, and expanding gas is jetted from the gas jetting section at the end of the casing 12. The starting device 21 for striking the detonator 10 is provided beside the detonator 10 of the gas generator 8.

The starting device 21 comprises: an igniting pin 22 of non-magnetic material such as stainless steel which is adapted to move towards the detonator (to the left in FIG. 1) to strike against and ignite the detonator 10 an inertial body 23 which is a cylindrical permanent magnet having a through-hole 23a along the central axis in which the igniting pin 22 is loosely fitted; an annular permanent magnet 24 whose inside diameter is larger than the outside diameter of the inertial body 23; and a metal trigger casing 25 which accommodates the igniting pin, the inertial body, and the annular permanent magnet, wherein the trigger casing 25 is fixedly mounted on the retractor base 18. Those permanent magnets may be KS steel or Alnico magnets, or sintered magnets such as ferrite magnets and rare earth magnets, or plastic magnets.

The igniting pin 22 has a striker 22a at the end. The striker 22a is to strike the detonator 10, and has a flange 22b at the base. The igniting pin 22 is held in the trigger casing 25 with its rear end portion slidably fitted in the bottom wall 25c of the casing 25. More specifically, the striker 22a is extended through an opening 25b formed in the wall 25a of the trigger casing 25 on the side of the detonator 10, thus being held in contact with the detonator 10. And a gap is formed between the flange 22b and the inner surface of the wall 25a. Hence, when the inertial body 23 collides with the flange 22b, it applies kinetic energy to the ignition pin 22 through the flange 22b, so that the ignition pin 22 is moved towards the detonator 10 to cause the striker 22a to strike the detonator 10. As a result, the explosive is ignited.

Figure 3:
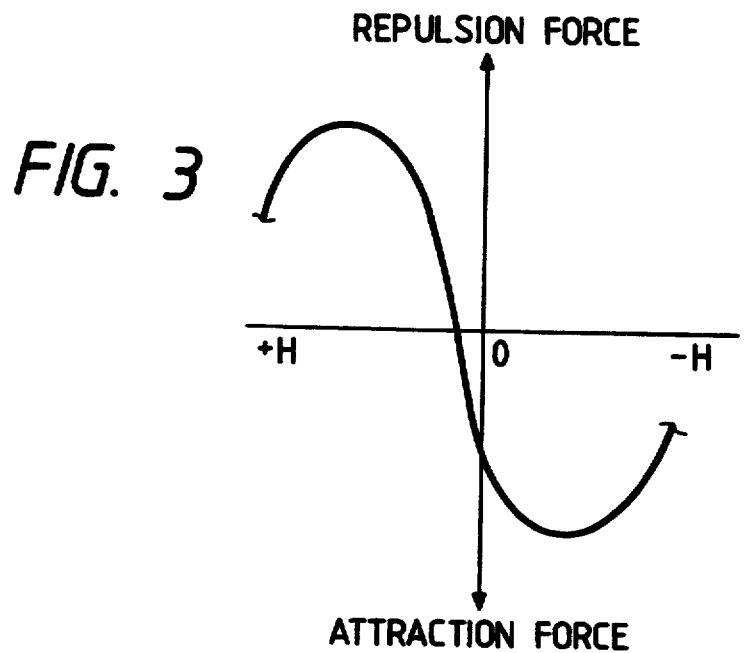
FIG. 3 is a graphical representation indicating the relationships between the relative positions H of an annular permanent magnet and an inertial body shown in FIG. 1 and the magnetic repulsion/attraction forces therebetween.

The annular permanent magnet 24 is fitted in the trigger casing 25 on the side of the detonator 10 (on the left-handed side in FIG. 1), while the inertial body 23 loosely mounted on the igniting pin 22 is fitted in the trigger casing 25 on the side of the bottom wall 25c (on the right-handed side in FIG. 1). Therefore, the two magnets, namely, the annular permanent magnet 24 and the inertial body 23 are confronted with each other through the same magnetic poles. Hence, the relationships between the position H of the detonator-side end face 23b of the inertial body 23 with respect to the bottom-wall-side face 24a of the annular permanent magnet 24 and the magnetic repulsion/attraction force are as indicated in a graphical representation of FIG. 3. (H being negative in the case where the denonator-side end face 23b is closer to the detonator than the bottom-wall-side end face 24a).

The inertial body 23, as was described before, is so arranged that the detonator-side end face 23b is spaced by a distance h from the bottom-wall-side end face 24a, and the inertial body 23 and the annular permanent magnet 24 are confronted with each other through the same magnetic poles (the S-poles in FIG. 1). Therefore, the inertial body 23 is urged towards the bottom wall by the magnetic repulsion force. In addition, the inertial body 23 is slidable axially along the igniting pin 22. However, when a force applied to the inertial body 23 to move the latter towards the detonator is smaller than the magnetic repulsion force between the annular permanent magnet 24 and the inertial body 23, the latter 23 is not moved towards the detonator, and therefore the starting device 21 is not activated.

Figure 2:
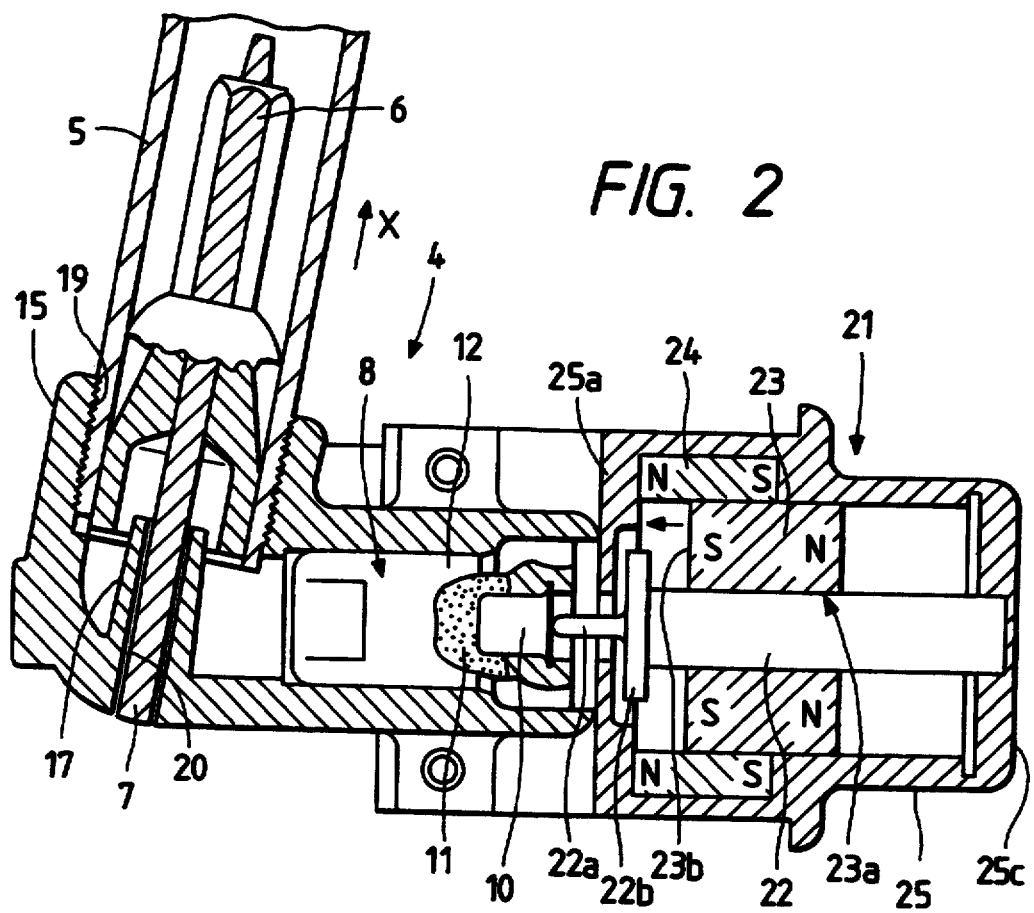
FIG. 2 is an enlarged sectional view showing essential components of the retractor shown in FIG. 1.

When, on the other hand, the force of inertia of the inertial body 23, which is the product of the weight of the latter 23 and the acceleration toward the detonator, is greater than the magnetic repulsion force, the inertial body 23 is moved towards the detonator as indicated in FIG. 2. When the inertial body 23 is further moved until the magnetic attraction force between the annular permanent magnet 24 and the inertial body 23 acts on the inertial body 23, the latter 23 is accelerated towards the detonator by the magnetic attraction force. As a result, the inertial body 23 is inserted into the annular permanent magnet 24, thus striking against the flange 22b.

That is, the inertial body 23 sensing the acceleration of the vehicle body directly applies striking energy to the detonator 10. As is apparent from the above description, the starting device 21 is simple in construction and can be assembled with ease, and the striking energy to be applied to the detonator 10 can be increased according to the acceleration acting on the inertial body 23. Furthermore, nothing abuts against the igniting pin 22 and the inertial body 23. Therefore, the starting device is free from the difficulty accompanying the conventional one that its operation becomes unstable because the members abutting against the igniting pin and the inertial body rust or tie together when the device is used for a long time. Therefore, the starting device is stable in operation at all times. Furthermore, the acceleration detecting characteristic of the starting device can be readily changed by adjusting the magnetic force and the relative position of the inertial body 23 and the annular permanent magnet 24, and therefore the system can be designed with a large degree of freedom.

Now, the operation of the retractor 1 with the pretensioner 3 will be described.

When the vehicle is travelling normally, the pretensioner 3 is not engaged with the winding shaft. This is, the winding shaft is freely rotatable. Accordingly, the webbing 16 can be wound on with the aid of the elastic force of the winding spring, or can be pulled out against the elastic force.

When a deceleration occurs with the vehicle to some extent as in the case where the vehicle is braked suddenly, the emergency locking mechanism 13 of the retractor operates to lock the rotation of the winding shaft. As a result, the webbing is prevented from being pulled out. In this case, the force of inertia acting on the inertial body 23 is smaller than the magnetic repulsion force between the annular permanent magnet 24 and the inertial body 23. Therefore the starting device 21 is not operated, and the driving means 4 of the pretensioner 3 is not operated.

When, on the other hand, a considerably large predetermined deceleration occurs with the vehicle, as in the case where the latter collides with something, the force of inertia acting on the inertial body 23 is greater than the magnetic repulsion force between the annular permanent magnet 24 and the inertial body 23. Therefore, the inertial body 23 is moved toward the detonator, thus striking against the flange 22b. As a result, the igniting pin 22 strikes and ignites the detonator 10. When the detonator 10 is ignited in this way, the explosive in the gas generator 8 is burnt to form combustion gas. The combustion gas thus formed is delivered into the cylinder 5, so that the piston 6 is moved upwardly (or in the direction of the arrow X) quickly by the pressure of the combustion gas. This piston driving force, which is a predetermined force, pulls the wire 7 in the direction of the arrow X quickly. As a result, the winding shaft is turned in the webbing winding direction so that the webbing 16 laid over the passenger is stretched tight. Consequently, the seat belt is tightened.

Hence, it is unnecessary to use vehicle body acceleration detecting means such as an acceleration sensor which detects the collision of the vehicle and other troubles to output an ignition signal, or to use a control circuit which determines from the ignition signal whether or not the igniting heater should be energized. Therefore, the retractor 1 with the pretensioner 3 is simple in construction. In addition, the connecting wires between those means can be eliminated. Thus, the retractor 1 with the pretensioner is high in reliability and low in manufacturing cost.

Figure 4:
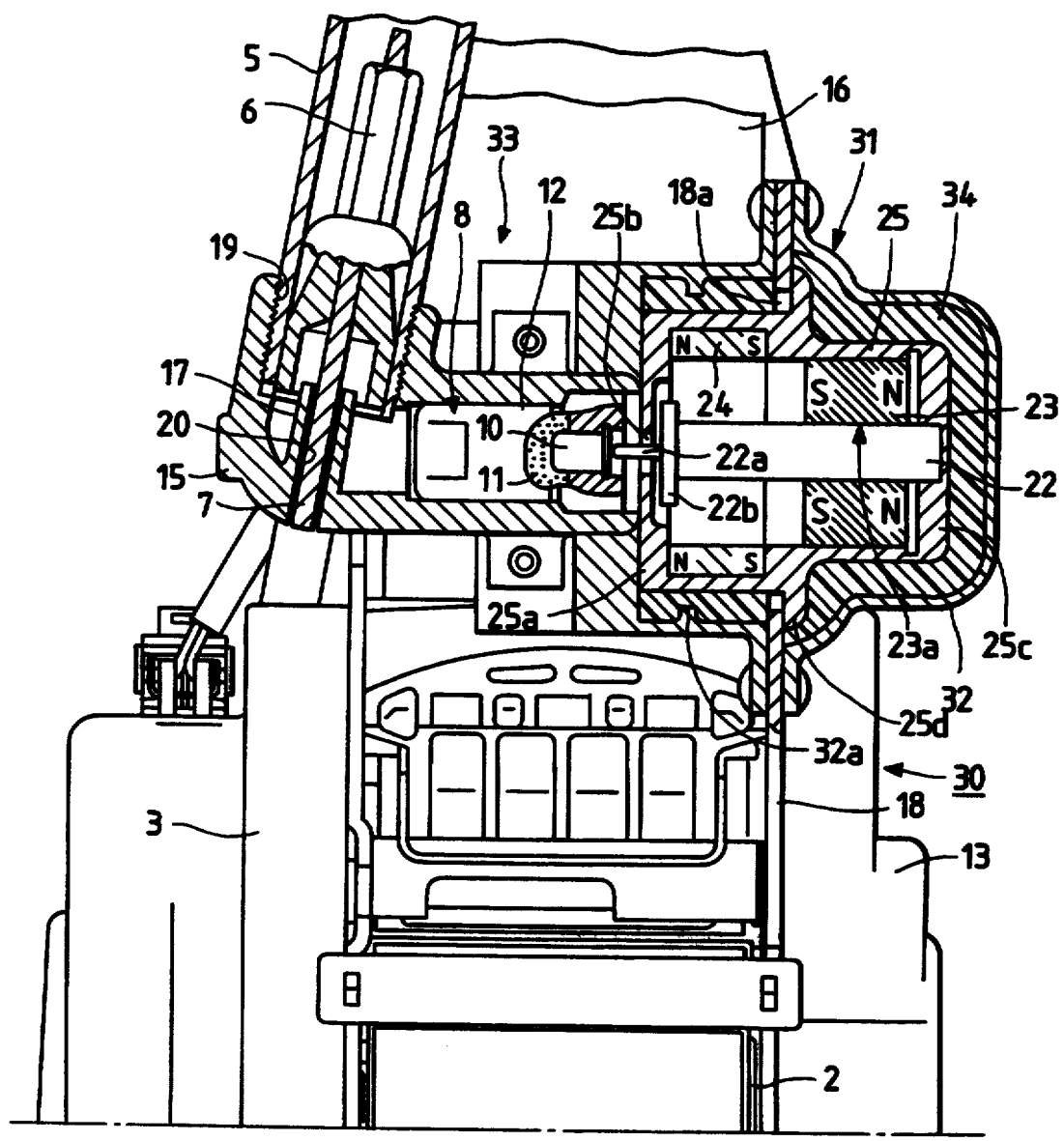
FIG. 4 is a front view, with parts cut away, showing essential components of another example of the retractor, which constitutes a second embodiment of the invention.

FIG. 4 is a sectional view showing part of drive means 33 in a retractor 30 with a pretensioner 3, which constitutes a second embodiment of the invention. In FIG. 4, parts corresponding functionally to those which have been described with reference to FIG. 1 are designated by the same reference numerals or characters.

In the second embodiment, a starting device 31, similarly as in the case of the above-described starting device 21, comprises: an igniting pin 22; an inertial body 23, an annular permanent magnet 24; and a trigger casing 25 accommodating the igniting pin 22, the inertial body 23, and the annular permanent magnet 24. The housing 25 is not directly secured to the retractor base 18 but is, it is held through a shock absorbing material 34 of foamed urethane filled in a metal mounting cover 32 which is secured to the retractor base 18 in such a manner as to surround the trigger casing 25. The starting device 31 is installed as follows: the trigger casing 25 is loosely fitted in an opening 18a formed in the retractor base 18, and is held by the shock absorbing material 34 with its flange 25d abutted against the periphery of the opening 18a. Therefore, the starting device 31 is in so-called "floating state" and is movable in all directions except direction of the detonator. In order to eliminate the impossibility for the striker 22a to strike the detonator 10 when the trigger casing 25 is shifted laterally, tubular protrusions 32a are extended from the inner surface of the mounting cover 32 which are able to prevent the trigger casing 25 from shifting laterally more than a predetermined distance.

The starting device 31 is constructed as described above. Hence, when the vehicle collides with something in front, a shock caused in "a front collision direction (the direction of the right-handed side in FIG. 4) is transmitted through the flange 25d abutted against the retractor base 18 to the trigger case 25; while shocks in the other directions are attenuated by being transmitted through the shock absorbing material 34.

That is, the starting device is less sensitive to pulse-like accelerations in the other directions than to those in the front collision direction. This prevents the starting device from being activated by careless shocks such as vibrations produced when the door is closed, or the vehicle body is knocked. Furthermore, the sensitivity to the shock in the front collision direction is increased; that is, the acceleration detecting characteristic can be adjusted readily.

In each of the above-described embodiments, the starting device is used to activate the gas generator of the seat belt tightening device. However, it should be noted that the invention is not limited thereto or thereby. For instance, it can be used to operate the gas generator of an air bag.

In addition, it should be noted that the configurations of the components of the starting device according to the invention are not limited to those described above. That is, it goes without saying that the components may be modified or changed in configuration in various manners without departing from the spirit of the invention.

In the starting device of the invention, the inertial body adapted to sense the acceleration of the vehicle body provides the striking energy which is to be applied to the detonator. Therefore, the starting device is simple in construction, and can be assembled readily. Furthermore, the striking energy to be applied to the detonator can be increased according to the acceleration acting on the inertial body. In addition, in the starting device, the igniting pin and the inertial body are pushed by nothing. Hence, the starting device is free from the difficulty accompanying the conventional one that the engaging portions of the stopper of the trigger shaft and the flange of the igniting pin may rust or may be fixedly tied to each other when it is used for a long time, thus resulting in an unsatisfactory operation of the starting device. The starting device is surrounded with the shock absorbing material in all directions except the direction of movement of the inertial member, so that it is less sensitive to pulse-like accelerations in directions other than the direction in which a shock occurs when the vehicle collides with something in front. Hence, the starting device is prevented from being activated by careless shocks such as vibrations produced when the door is closed, or when the vehicle body is knocked. Thus, the starting device of the invention is high in reliability since it is prevented from operating erroneously, and can be assembled with high efficiency since it is simple in structure, and accordingly it is low in manufacturing cost.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A starting device adapted to strike a detonator in response to an acceleration higher than a predetermined value to activate a gas generator, comprising:
    an igniting pin adapted to move in a first direction to collide with said detonator so as to ignite said detonator;
    an inertial body comprising a permanent magnet for supplying kinetic energy to said igniting pin; and
    an annular permanent magnet, the inside diameter of which is larger than the outside diameter of said inertial body, wherein a first magnetic pole of said annular permanent magnet confronts a second magnetic pole of said inertial body, which has the same polarity as said first magnetic pole, and said first and second magnetic poles produce a magnetic repulsion force which urges said inertial body in a second direction substantially opposite to said first direction, and when said magnetic repulsion force is less than a force of inertia of said inertial body, which is a product of the weight of said inertial body and an acceleration of said inertial body, said force of inertia moves said inertial body in said first direction.

2. A starting device as claimed in claim 1, wherein said inertial body has a through-hole in which said igniting pin is loosely inserted.

3. A starting device as claimed in claim 2, wherein said igniting pin is coaxial with said inertial body.

4. A starting device as claimed in claim 3, further comprising a trigger casing accommodating said igniting pin, said inertial body, and said annular permanent magnet.

5. A starting device as claimed in claim 4, wherein said igniting pin is made of a non-magnetic material, and has a striker at a front end thereof which is to strike said detonator, and a flange at a base end thereof, and has a rear end portion slidably fitted in a bottom wall of said trigger casing.

6. A starting device as claimed in claim 5, wherein said annular permanent magnet is fitted in said trigger casing on the side of said detonator while said inertial body is set in said trigger casing on the side of said bottom wall so that said first magnetic pole of said annular permanent magnet and said second magnetic pole of said inertial body confront each other.

7. A starting device as claimed in claim 6, wherein said annular permanent magnet applies a magnetic attraction force to said inertial body when said inertial body moves within a part of said trigger casing to which said annular permanent magnet is fitted, and said magnetic attraction force accelerates said inertial body in the first direction so that said inertial body strikes against said flange of said igniting pin to cause said igniting pin to strike said detonator.

8. A starting device adapted to strike a detonator in response to an acceleration higher than a predetermined value to activate a gas generator, comprising:
  an igniting pin adapted to move towards said detonator to collide with said detonator so as to ignite said detonator;
  an inertial body made of a cylindrical permanent magnet, said inertial body having a through-hole along a central axis of said inertial body, in which said igniting pin is loosely inserted;
  an annular permanent magnet, the inside diameter of which is larger than the outside diameter of said inertial body; and
  a trigger casing accommodating said igniting pin, said inertial body, and said annular permanent magnet,
  wherein said annular permanent magnet is fitted in said trigger casing on the side of said detonator while said inertial body is set in said trigger casing on the side of a bottom wall so that a first magnetic pole of said annular permanent magnet and a second magnetic pole of said inertial body confront each other.

9. A starting device as claimed in claim 8, wherein said first magnetic pole and said second magnetic pole have equivalent polarity and produce a magnetic repulsion force which urges said inertial body away from said detonator and when said magnetic repulsion force is less than a force of inertia of said inertial body, which is the product of the weight of said inertial body and an acceleration of said inertial body, said force of inertia moves said inertial body towards said detonator.

10. A starting device as claimed in claim 9, wherein said annular permanent magnet applies a magnetic attraction force to said inertial body when said inertial body moves within a part of said trigger casing to which said annular permanent magnet is fitted, and said magnetic acceleration force accelerates said inertial body towards said detonator.

11. A starting device for a seat belt tightening device which, upon collision of a vehicle equipped with said seat belt tightening device, is driven by gas pressure to turn the winding shaft of a retractor to pull in a seat belt, in which, in response to an acceleration higher than a predetermined value, a detonator is struck to activate a gas generator, comprising:
  an igniting pin adapted to move towards said detonator to collide with said detonator so as to ignite said detonator;
  an inertial body made of a cylindrical permanent magnet, said inertial body having a through-hole along a central axis in which said igniting pin is loosely inserted;
  an annular permanent magnet, the inside diameter of which is larger than the outside diameter of said inertial body; and
  a trigger casing accommodating said igniting pin, said inertial body, and said annular permanent magnet.

12. A starting device as claimed in claim 11, wherein said trigger casing is fixedly secured to a retractor base.

13. A starting device as claimed in claim 11, wherein said trigger casing is held through a shock absorbing material filled in a mounting cover which is fixedly secured to said tractor base.

14. A starting device as claimed in claim 13, wherein said shock absorbing material is a foamed urethane material.

15. A starting device as claimed in claim 13, wherein tubular protrusions are extended from an inner surface of said mounting cover to prevent said trigger casing from being shifted laterally more than a predetermined distance.

16. A starting device as claimed in claim 11, wherein said igniting pin has a striker at a front end thereof which is to strike said detonator, and a flange at a base end thereof, and has a rear end portion slidably fitted in a bottom wall of said trigger casing.

17. A starting device as claimed in claim 16, wherein said annular permanent magnet is fitted in said trigger casing on the side of said detonator while said inertial body is set in said trigger casing on the side of said bottom wall in such a manner that a first magnetic pole of said annular permanent magnet and a second magnetic pole of said inertial body confront each other.

18. A starting device as claimed in claim 17, wherein said first magnetic pole and said second magnetic pole have equivalent polarity produce a magnetic repulsion force which urges said inertial body away from said detonator.

19. A starting device as claimed in claim 18, wherein when said magnetic repulsion force is less than a force of inertia of said inertial body, which is a product of the weight of said inertial body and an acceleration of said inertial body, said force of inertia moves said inertial body towards said detonator.

20. A starting device as claimed in claim 19, wherein said annular permanent magnet applies a magnetic attraction force to said inertial body when said inertial body moves within a part of said trigger casing in which said annular permanent magnet in fitted, and said magnetic attraction force accelerates said inertial body towards said detonator so that said inertial body strikes against said flange of said igniting pin to cause said igniting pin to strike said detonator.

* * * * *